Sept. 8, 1931.  A. E. BROUGHTON  1,822,005
AUTOMATIC CONTROL ADJUSTING DEVICE
Filed May 19, 1930  2 Sheets-Sheet 1
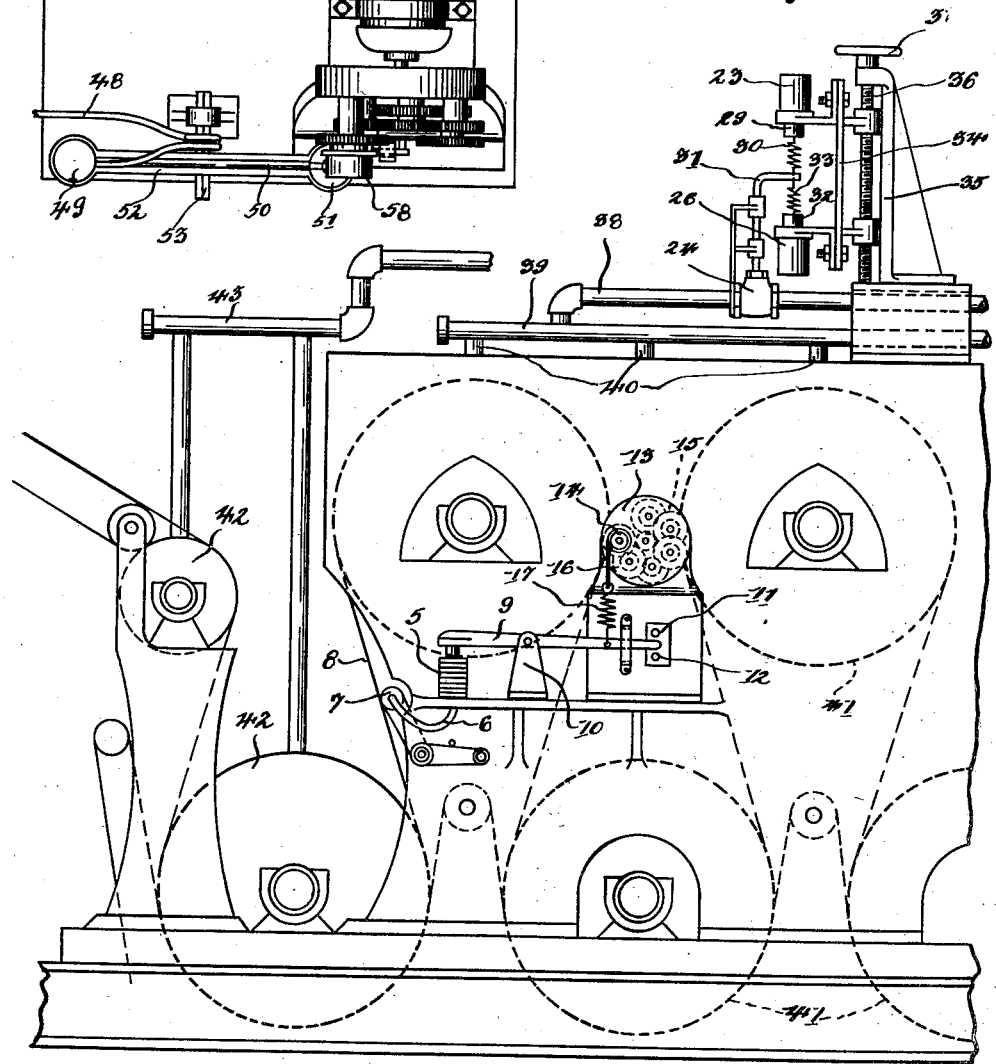
Inventor
Arthur E. Broughton
By Stryker & Stryker
Attorneys

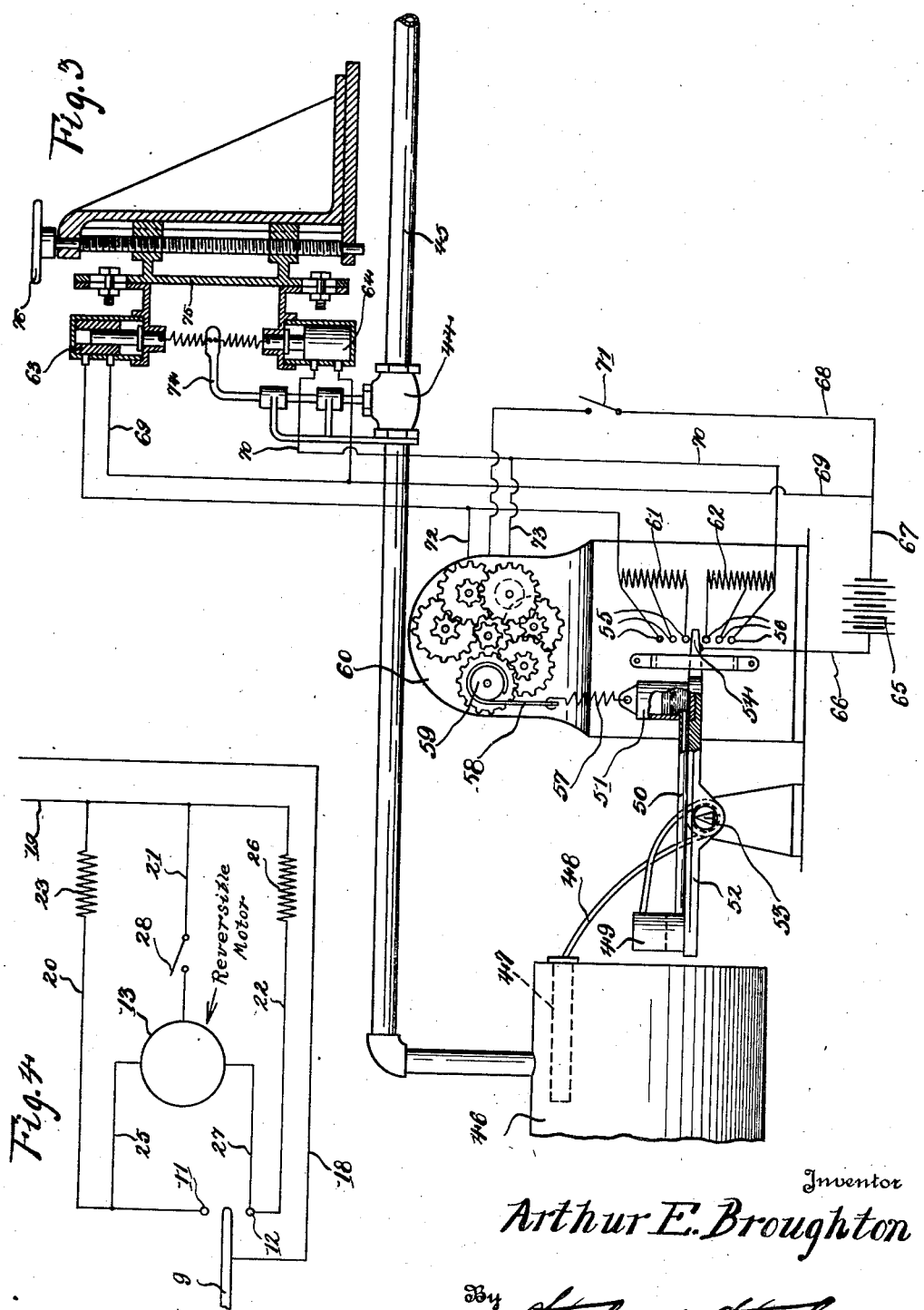

Patented Sept. 8, 1931

1,822,005

UNITED STATES PATENT OFFICE

ARTHUR E. BROUGHTON, OF MINNEAPOLIS, MINNESOTA

AUTOMATIC CONTROL ADJUSTING DEVICE

Application filed May 19, 1930. Serial No. 453,715.

This invention relates to a control device particularly, although not exclusively, adapted for use in connection with my means and method for indicating weight and moisture variations in paper machines or the like described and claimed in my co-pending application filed April 7, 1930, Serial No. 442,268.

The invention of said co-pending application has for its object the automatic regulation of the consistency and moisture content of paper and particularly to a thermostatic control which actuates means for increasing or decreasing the weight of the stock according to the temperature of the paper web at a point near the wet end of the drier. The control devices must be capable of ready readjustment where paper of different weights is to be manufactured.

The present invention has for its object the automatic readjustment of the automatic control so as to maintain the paper on any desired weight basis with a minimum of manual operations. When the paper machine is to be readjusted for a different weight and moisture content it is only necessary to operate a single electric switch and then regulate the manual controls in the usual manner, whereupon the mechanism automatically maintains the several control elements in properly adjusted positions for the new basis weight.

In the accompanying drawings which illustrate the best form of my device at present known to me, Figure 1 is a side elevation of one form of the mechanism in connection with a diagrammatic illustration of a paper drier; Fig. 2 is a plan view of a modified form of device; Fig. 3 is a side elevation of the modified form, partially in section and showing diagrammatically the electric connections with valve actuating mechanism and Fig. 4 is a wiring diagram showing the wiring connections for the electrical elements illustrated in Fig. 1.
As shown in Fig. 1, my device has an expansible chamber 5 or bellows which is supplied with a suitable volatile fill and is connected by a pipe 6 with a thermometer bulb 7 for the thermostatic control. As more fully described in my copending application above identified, the thermometer bulb 7 is placed in contact with the paper web 8 near the wet end of the drier so that variations in the weight and consistency cause a change in the fluid pressure in the chamber 5 which chamber expands and contracts in accordance with the changes. The upper end of the chamber 5 is arranged to actuate a lever 9 having a suitable pivotal support 10. One end of the lever 9 is movable from a neutral or central position to make contact with electric contact terminals 11 and 12 respectively. An electric motor 13 of the reversible type is operatively connected to a drum 14 through suitable speed reducing gears indicated generally by the numeral 15. Wound on the drum 14 is a flexible band 16 to the free end of which is secured a coiled spring 17. The spring 17 is connected at its lower end to the lever 9 and is maintained under tension so as to press an end of the lever against the chamber 5 and thereby maintain the same under compression.

As shown in Fig. 4, the lever 9 is placed in circuit with one of the line wires 18 and the other line wire 19 has a series of branches 20, 21 and 22. The branch 20 includes a coil 23 of electrical actuating means for a valve 24 (Fig. 1). This wire 20 is connected to the contact terminal 11 and has a branch 25 extending to one terminal of the motor 13. The branch 22 includes a coil 26 of electrical valve actuating means. A branch wire 27 connects the terminal 12 with one of the terminals of the motor 11. The branch 21 is controlled by a manually operable switch 28 and is connected to the third terminal of the reversible motor 13. This motor is so arranged that it can not operate when the switch 28 is open and the direction in which its shaft is rotated is dependent on which of the wires 25 or 27 is connected to the line wire 18 by the switch lever 9.

Where the device is applied to a paper machine control, like that described in my application above identified, the coil 23 is the coil of a solenoid having a plunger 29 (Fig. 1) connected by a spring 30 to the stem 31 of the valve 24. The coil 26 is that of a solenoid having a plunger 32 connected by a spring 33 with the stem 31. The solenoids are supported in rigid spaced relation to each other on a carriage 34 which is mounted for vertical movement on a supporting bracket 35. A long screw 36 has a threaded engagement with the carriage 34 and is adapted to be manually turned by a handle 37 to raise or lower the solenoids together with the valve stem 31. By manipulating the handle 37, the opening of the valve 24 may be regulated independently of the solenoids.

As shown in Fig. 1, the valve 24 is placed in a pipe 38 for supplying steam to a header 39 having branches 40 communicating with the interior of cylindrical driers 41. The driers 41 are those over which the paper web 8 passes after making contact with the bulb 7. Cylindrical driers 42 may be supplied with steam from a separate header 43, as more fully described in my copending application above identified.

In the alternate form of my device shown in Fig. 3, a valve 44 is arranged to control a steam supply pipe 45 communicating with a receptacle indicated by the numeral 46. A bulb 47 of a thermostatic control extends in the receptacle 46 and has a small flexible tube 48 connecting it with a chamber 49 in the bottom of which is placed a quantity of a heavy liquid, preferably mercury. The chamber 49 is connected by a tube 50 to a second chamber 51, these chambers being mounted near opposite ends of a tiltable lever 52. A suitable fulcrum support 53 is provided for the lever 52 and at one end a switch element or finger 54 projects to engage groups of contact terminals 55 and 56 respectively mounted above and below a central or neutral position of the finger 54. A coiled spring 57 is connected to the chamber 51 and is held under tension by a flexible band 58 which is wound on a drum 59. This drum, in turn, is operatively connected by a train of speed reducing gears to a reversible motor 60.

The electric circuits and actuating means for the valve 44 and motor 60 are similar to those above described except that potentiometers 61 and 62 are provided to give a step by step increase in the current supplied to the coils 63 and 64 of the solenoids for actuating the valve 44. The circuits include a source of electric current 65, a wire 66 connecting said source to the finger 54 and a wire 67 having branches 68, 69 and 70 respectively including a manual control switch 71 for the motor 60, the solenoid coil 63 and the solenoid coil 64. The potentiometer 62 is included in the circuit 70 and the potentiometer 61 in the circuit 69, while branches 72 and 73 of the circuits 69 and 70 are provided to include the reversible motor 60. The valve 44 has a stem 74 connected by springs to the plungers of solenoids having the coils 63 and 64 as in the preferred construction. A supporting carriage 75 for the solenoids is movable by a handle 76 to manually regulate the opening of the valve 44.

*Operation*

In operation changes in the fluid pressure in the chamber 5 result in a movement of the switch lever 9 to make contact with the terminal 11 or 12 so that at a given time a circuit may be closed by said lever through either of the coils 23 or 26. In the normal operation of the system the switch 28 is maintained in open position so that the motor 13 is inoperative irrespective of whether the switch lever 9 is in contact with one of the terminals 11 or 12. However, when it is desired to make a change in the adjustment of the valve 24, the switch 28 is closed and then handle 37 and/or other manual controls for the paper machine are readjusted until the desired dryness of the web and consistency of the stock is secured. During this period of readjustment when the pressure in the chamber 5 changes in accordance with the changes in the temperature of the paper web there will be a corresponding movement of the lever arm 9 to one or the other of the terminals 11 or 12. As the pressure increases the lever 9 will be moved to make contact with the terminal 12. This closes the circuit to operate the motor 11 in such a direction as to wind the band 16 on the drum 14 and increase the tension of the spring 17 sufficiently to compensate for the increased pressure and move the lever 9 to its neutral position shown in full lines in Fig. 1. When the pressure in the chamber 5 is decreased below a predetermined minimum, the spring 17 actuates the lever 9 to close the circuit at the terminal 11. Now the circuit through the wire 25 to the motor becomes operative to actuate the motor in the reverse direction thus reducing the tension of the spring 17 and permitting the lever 9 to return to the neutral position. Upon the movement of the lever out of contact with the terminals 11 and 12 the motor circuit is opened and movement of the drum 14 is stopped. As the connections between the drum 14 and the motor are nonreversible, the neutral position of the lever 9 is maintained until further changes in the pressure in the chamber 5 result in further readjustment and return of the switch lever to neutral position. As soon as the machine is running properly the switch 28 is manually opened so that the automatic controls come into operation with a new neutral or normal position of the control lever 9 as the basis. The automatic controls for compensating for unavoidable variations are now effective and changes in the pressure in the chamber 5 result in energizing the coils 23 or 26 to compensate for the changes.

In the alternate form of the device shown in Figs. 2 and 3 the mechanism is arranged to control the steam pressure in the receptacle 46 by regulating the opening of the valve 44. In the normal operation the switch 71 is open and variations in the temperature and pressure in the receptacle 46 are reflected in the form of changed pressures in the volatile fill of the bulb 47. If there is an increase in temperature in the receptacle the volatile fill expands and increases the pressure on the mercury content of the chamber 49. This causes a flow of mercury through the pipe 50 into the chamber 51 with resulting increase in the weight on the spring 57. The spring is extended and the finger 54 makes contact with one of the terminals 56. Now current from the source 65 flows through the potentiometer 62 and through the circuit 70. including the coil 64 of the solenoid with the result that the valve 44 is closed sufficiently to compensate for the increased pressure in the receptacle 46.

When the normal condition is re-established, mercury from the chamber 51 flows back into the chamber 49 so that the arm 52 moves the finger 54 to neutral position. It will now be understood that when the pressure in the receptacle 46 is reduced below normal flow of mercury from the chamber 51 to the chamber 49 is brought about and the spring 57 acts to bring the finger 54 into contact with one of the terminals 55. This energizes the coil 63 and opens the valve 44 sufficiently to compensate for the reduced pressure.

My neutralizing device of the alternate form shown in Figs. 2 and 3 operates like that of the preferred form shown in Figs. 1 and 4. It is only necessary to close the switch 71 during any period of readjustment of the manual control 76. If a higher pressure is desired in the receptacle 46, the handle 76 is merely turned to increase the opening of the valve 44 and as the finger 54 makes contact with one of the terminals 56 the motor 60 is energized and rotates its shaft in the proper direction to wind the band 58 on the drum 59. This increases the tension of the spring 57 and as soon as the increased weight of mercury in chamber 51 has thus been compensated for the finger 54 is drawn to its neutral position and the motor 60 stops. When the switch 71 is again opened the new pressure is maintained in the receptacle 46 automatically.

If reduced pressure is to be maintained in the receptacle 46 the switch 71 is closed, whereupon the motor 60 operates in the direction to reduce the tension on the spring 57 sufficiently to compensate for the reduced weight of mercury in the chamber 51. Finally when the switch 71 is opened the new reduced pressure in the receptacle 46 is automatically maintained.

It will now be understood that the term "neutralizing device" may be applied to the motor 13 (or 60) together with its connections with the control lever 9 (or 52) and the electric circuits therefor because such mechanism renders the automatic control ineffectual during the period when manual adjustment is required. However, the mechanism performs the further function of readjusting the automatic control so that it subsequently maintains the changed basic condition.

Having described my invention what I claim as new and desire to protect by Letters Patent is:

1. In a control neutralizing device, the combination with a control element movable from a plurality of operative positions to a neutral position between said operative positions, of power-actuated means for moving said element to said neutral position and a single, manually operable control for rendering said power-actuated means operative.

2. In a neutralizing device for an automatic control, the combination with an element responsive to variations in fluid pressure, said element being movable from a plurality of operative positions to a neutral position between said operative positions, power-actuated means for moving said element to said neutral position against the action of said fluid pressure and a single, manually operable control for rendering said power-actuated means operative.

3. In a control neutralizing device, the combination with a control element responsive to changes in fluid pressure, said element being movable from a neutral position to a plurality of operative positions, a spring arranged to urge said element to an operative position, power-actuated means for increasing and decreasing the urge of said spring and means, including a manually operable element, for rendering said power-actuated means operative at will.

4. In a control neutralizing device, the combination with an electric control and a switch element movable from a plurality of operative positions to a neutral position between said operative positions, of a reversible motor for moving said switch to said neutral position and a single, manually operable switch for rendering said motor operative.

5. In a neutralizing device for an automatic control, the combination with a switch element responsive to variations in fluid pressure, said element being movable from a plurality of operative positions to a neutral position between said operative positions, electric control circuits having contacts corresponding to the operative positions of said element to be controlled thereby, electro-magnetic means for moving said element to said neutral position against the action of said fluid pressure, said electro-magnetic means being included in said control circuits and a single, manually operable switch for rendering said electro-magnetic means operative.

6. In a control neutralizing device, the combination with a switch element responsive to changes in fluid pressure, said element being movable from a neutral position to a plurality of operative positions, a spring arranged to urge said element to an operative position, electric circuits under control of said switch, a reversible motor included in said circuits for adjusting the urge of said spring and a manually operable switch in said circuits for rendering said motor operative at will.

7. The combination of a regulating valve and manually operable means for adjusting the opening of said valve, of power-actuated means for adjusting the opening of said valve, a control element for said power-actuated means, said element being movable from a neutral position to a plurality of operative positions, means for moving said element responsive to variations in fluid pressure, a spring connected to said element for urging it in one direction, power-actuated means for adjusting said spring and to move said element to neutral position and a manual control for rendering said last mentioned power-actuated means operative at will.

8. The combination of a regulating valve or the like and manually operable means for adjusting the opening of said valve, of electro-magnetic means for adjusting the opening of said valve, a control element for said electro-magnetic means, said element being movable from a neutral position to a plurality of operative positions, a spring for urging said element in one direction, power-actuated means for adjusting said spring and to move said element to neutral position and a manual control for rendering said power-actuated means operative at will.

9. The combination with a regulating valve or the like and manually operable means for adjusting the opening of said valve, of electric circuits, power-actuated means for adjusting the opening of said valve included in said circuits, a control element for said power-actuated means movable from a neutral position to a plurality of operative positions, said circuits having contacts corresponding to the operative positions of said element, means responsive to variations in fluid pressure for normally actuating said element, a spring for urging said element toward one of said contacts, power-actuated means for adjusting said spring and to move said element to neutral position and a manual control for rendering said last mentioned power-actuated means operative at will.

10. The combination with a regulating valve or the like and manually operable means for adjusting the opening of said valve, of a main electric circuit, power-actuated means for adjusting the opening of said valve included in said circuit, a control element for said power-actuated means movable from a neutral position to a plurality of operative positions, said circuit having contacts corresponding to the operative positions of said element, means responsive to variations in fluid pressure for normally actuating said element, a branch circuit including said contacts, power-actuated means in said branch circuit to move said element to neutral position and a manual control switch in said branch circuit for rendering said last mentioned power-actuated means operative at will.

11. The combination with a regulating valve or the like and manually operable means for adjusting the opening of said valve, of a main electric circuit, power-actuated means for adjusting the opening of said valve included in said circuit, a control element for said power-actuated means movable from a neutral position to a plurality of operative positions, said circuit having contacts corresponding to the operative positions of said element, means responsive to variations in fluid pressure for normally actuating said element, a spring for urging said element toward one of said contacts, branch circuits severally including said contacts, a reversible motor for adjusting said spring and arranged to move said element to neutral position, said motor being included in said branch circuits, and a manual control switch in said branch circuits for rendering said motor operative at will.

In testimony whereof, I have hereunto signed my name to this specification.

ARTHUR E. BROUGHTON.